United States Patent [19]

Tate et al.

[11] 4,035,322

[45] July 12, 1977

[54] METHOD OF PREPARING CURABLE PELLETS OF POLYETHYLENE

[75] Inventors: Stanley L. Tate; Bobby A. Rowland, both of Carrollton, Ga.; Herbert M. Jacobs, Cooleenee, N.C.

[73] Assignee: Southwire Company, Carrollton, Ga.

[21] Appl. No.: 566,887

[22] Filed: Apr. 10, 1975

Related U.S. Application Data

[63] Continuation-in-part of Ser. No. 496,681, Aug. 12, 1974, abandoned.

[51] Int. Cl.² .......................................... C08L 91/00
[52] U.S. Cl. ............................. 260/23 H; 260/34.2; 260/42.39; 260/42.42; 260/42.46; 526/22
[58] Field of Search .... 260/23 R, 45.7 R, 94.9 GH, 260/42.42, 42.46, 34.2

[56] References Cited

U.S. PATENT DOCUMENTS

| | | | |
|---|---|---|---|
| 3,578,647 | 5/1971 | Gregorian | 260/94.9 GA |
| 3,639,527 | 2/1972 | MacKenzie et al. | 260/94.9 GA |

FOREIGN PATENT DOCUMENTS

| | | | |
|---|---|---|---|
| 899,796 | 6/1962 | United Kingdom | 260/94.9 GA |

Primary Examiner—Lewis T. Jacobs
Attorney, Agent, or Firm—Van C. Wilks; Herbert M. Hanegan; Stanley L. Tate

[57] ABSTRACT

The present invention relates to a method for preparing curable pellets of polyethylene and copolymers thereof for subsequent use in an extrusion coating process by mixing polyethylene pellets with a liquid curing agent at a temperature below the decomposition temperature of the curing agent and below the softening point of polyethylene and copolymers thereof.

8 Claims, 1 Drawing Figure

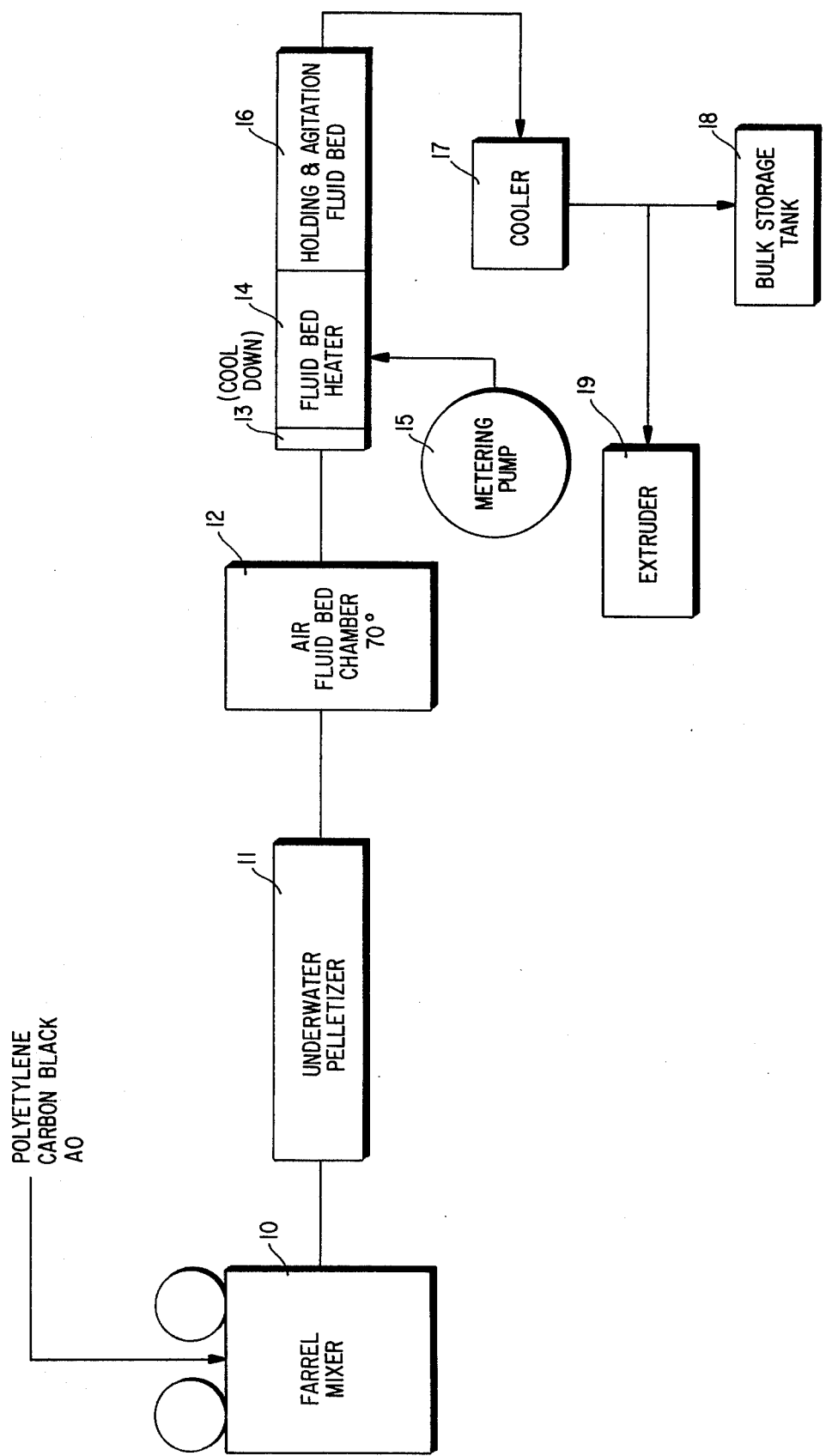

METHOD OF PREPARING CURABLE PELLETS OF POLYETHYLENE

CROSS REFERENCE TO RELATED APPLICATIONS

This application is a continuation-in-part of a copending application Ser. No. 496,681, filed Aug. 12, 1974 now abandoned.

BACKGROUND OF THE INVENTION

The present invention relates to the preparation of curable pellets of polyethylene or copolymers of polyethylene for use in a continuous vulcanization extrusion coating process.

In order to produce vulcanized extruded articles from curable pellets of polyethylene or its copolymers a curing agent such as an organic peroxide must be uniformly dispersed throughout the polymer prior to the extrusion of the curable polyethylene upon a wire or other article which is being coated therewith. Heretofore, curable pellets of polyethylene and copolymers of polyethylene for use in extrusion coating processes have been prepared by one of the methods: (1) in which polyethylene or copolymers thereof and a curing agent are mixed on a two-roll mill above the melting point of the polyethylene and the resulting blend cooled and repelletized using a pelletizer; (2) in which the polyethylene or its copolymers and a curing agent are first premixed at a temperature below the melting point of polyethylene in a mixer such as a ribbon blender or vortex mixer, then fused and mixed at a temperature above the melting point of polyethylene in a twin screw continuous mixer and subsequently cooled and pelletized; (3) in which polyethylene or copolymers thereof and a curing agent are mixed at a temperature above the melting point of polyethylene using a Banbury mixer, calendered at a temperature above the softening point using a two-roll mill and thereafter the mixture is cooled and pelletized; or (4) in which the polyethylene or copolymers thereof and inert fillers and other additives are fused and mixed at a temperature above the melting point of polyethylene in a twin-screw continuous mixer or Banbury mixer and the mixture is thereafter cooled and pelletized and the curing agent is subsequently added at a later time in a high intensity mixer at a temperature below the softening point of polyethylene by stirring curing agent and pellets at a high speed until the curing agent is evenly dispersed on the pellets and absorbed therein.

The above methods have shortcomings in that the pellets produced are likely to become contaminated during the milling and mixing stages of the process thereby causing the extruded articles produced therefrom to have impaired dielectric properties or the vulcanization reaction can be started during the mixing process if the processing temperature exceeds the decomposition. Moreover, the cost of the equipment used is high and the production rates are low.

SUMMARY OF THE INVENTION

It is, therefore, a principle object of the present invention to provide a method for overcoming the aforementioned disadvantages of the prior art techniques by providing an economical contaminant free method for producing curable pellets of polyethylene and copolymers of polyethylene for insulating wire and cable. It is another object of the present invention to provide a continuous method of uniformly dispersing a suitable curing agent throughout a matrix of polyethylene and copolymers of polyethylene, without heating the polyethylene matrix above the softening point thereof.

Still another object of the present invention is to provide a method for continuous addition of a curing agent to a matrix which consists of pellets of polyethylene and coplymers thereof without heating the mixture to a temperature equal to or above the decomposition temperature of the curing agent.

These and other objects of the present invention are accomplished by providing a method for continuously producing curable pellets of polyethylene and copolymers for use in a continuous vulcanization extrusion coating process thereof whereby a composition comprising polyethylene or the copolymers thereof and a filler selected from the group consisting of silica, carbon black, alumina and calcium silicate are mixed with a curing agent which is an organic peroxide by first fusing the polyethylene or copolymers thereof with a filler or combination of fillers selected from the group outlined above in a plasticating mixer at a temperature above the softening point of the polyethylene until the filler is evenly dispersed throughout the polymer matrix whereupon the polymer filler mixture is processed into pellets. The pellets so produced are then dried and are subsequently contacted with a stochiometric amount of the curing agent in liquid form at a temperature below the softening point of the polymer and at a temperature below the decomposition temperature of the curing agent and aging the pellet-curing agent with agitation until the curing agent has been absorbed below the surface of the pellets.

A principal advantage of the present invention over prior art techniques is the cost savings which accrue from the use of the technique disclosed herein. These cost savings are primarily derived from decreased operating costs of plasticating equipment. As will be appreciated, the present invention eliminates the need for operating plasticating equipment at temperatures below the thermal decomposition temperature of the curing agent thereby increasing the output of pellets from the plasticating mixer by a factor of two to three. It will also be appreciated that by producing curable polyethylene pellets in which the curing agent has not been exposed to temperatures above the thermal decomposition temperature thereof both the extrusion rate and the quality of products extruded therefrom are enhanced.

These and other objects, features and advantages of the present invention will become more apparent from a study of the drawing and the specification which follows.

BRIEF DESCRIPTION OF THE DRAWING

FIG. 1 is a diagrammatic representation of a process for the continuous addition of curing agent to pellets of polyethylene and copolymers of polyethylene.

DESCRIPTION OF THE PREFERRED EMBODIMENT

Broadly stated, the drawing illustrates in diagrammatic form a process for mixing organic peroxide curing agents with polyethylene pellets. As shown in FIG. 1, the apparatus consists of a Mixer 10, a pelletizer 11, dryer 12, a cooler 13, curing agent addition chamber 14, a metering pump 15, an aging chamber 16, cooler 17 and tank 18.

Polyethylene, copolymers of polyethylene, fillers and antioxidants are combined into a homogenuous mixture by fusion in mixer 10 after which this mixture is pelletized in pelletizer 11 and the resulting pellets are thereafter conveyed to dryer 12. As the pellets pass through dryer 12 they are blown dry with −46° C dew point air for a period of from about one to about four hours. The dried pellets exit dryer 12 and enter cooler 13 wherein the temperature of the pellets is lowered to 50° C. After pellet temperature has been stabilized at 50° C the pellets are conveyed to curing agent addition chamber 14 wherein curing agent in the form of liquid organic peroxide is sprayed through the pellet mass while the mass is being violently agitated. The pellet mass next passes to agitation and aging chamber 16 wherein the pellets and curing agent are mixed by blowing turbulent air through the pellets for a period of from about four to about nine hours or until it is determined by empirical tests that each pellet has been coated with a stochiometric amount of curing agent. The pellets next progress to cooler 17 wherein pellet temperature is lowered to no more than 25° C before the pellets are stored in tank 18.

The term "turbulent air" used herein means air having a velocity such that the surfaces of the pellets are made soft by a combination of friction and collision of the pellets with each other and the container walls and such that the pellets do not adhere to each other. It is believed that the pellets do not adhere to each other to form lumps because the surface of each pellet is soft only momentarily at those portions of the pellet where the pellets suffer friction and collisions from the agitation, and that the inner portion of the pellets remain at a temperature well below the softening points of the polyethylene homopolymer or copolymer. As a result of the agitation the curing agent penetrates and diffuses into the pellets through the softened surface layer. It is believed that the liquid crosslinking agent penetrates and diffuses into the pellets through the softened areas on the pellet surfaces by liquid-liquid diffusion. Since the rate of diffusion of a liquid in another liquid, excluding combination of completely incompatible liquids, is generally higher than that of a liquid into a solid or a solid into a solid, liquid curing agents penetrate and diffuse into the pellets at a higher rate when the surfaces of the pellets are softened than when the pellet surfaces are in a non-softened state. In the preferred embodiment of the present invention, the curing agent herein is an organic peroxide and specifically is either the organic peroxide α, α-bis(t-butylperoxy)-diisopropyl benzene or dicumyl peroxide.

For example, curable pellets of the polyethylene wire insulation formulations shown in Table I were prepared by adding the indicated amounts of the curing agent α, α-bis(t-butylperoxy)-diisopropyl benzene using the method and apparatus described herein. The antioxidant referred to in Table I is polymerized-1,2-dihydro-2,2,4-trimethyl quinoline.

TABLE I

| INGREDIENT | COMPOUND A, % | COMPOUND B, % | COMPOUND C, % |
|---|---|---|---|
| Polyethylene | 69.820 | 83.264 | 65.42 |
| Antioxidant | 0.345 | 0.416 | 0.16 |
| Carbon black | 27.970 | 14.156 | — |
| Zinc stearate | 0.345 | 0.416 | 0.33 |
| Chlorinated polyethylene | | | 8.51 |
| Antimony trioxide | | | 5.23 |
| Clay | | | 18.45 |
| Lead oxide | | | 0.26 |
| Curing agent | 1.520 | 1.748 | 1.64 |

As would be obvious to one skilled in the art, the higher the working temperature, the shorter the requisite mixing time. However, when the requisite mixing time is shortened only by raising the working temperature the working temperature must not be so high that the curing agent penetrates and diffuses into the pellets before it is uniformly dispersed throughout the pellets which can cause lack of uniformity in the concentration of curing agent penetrating into individual pellets. Further, if the working temperature is set near the softening point of polyethylene the pellets tend to cohere into lumps before or during agitation.

Although only a preferred embodiment of the invention has been illustrated herein, it is to be understood that minor modifications can be made therein without departing from the spirit and scope of the invention disclosed herein.

What is claimed is:

1. A method of preparing curable pellets of polyethylene and copolymers of polyethylene comprising the steps of:
   a. fusing polymers such as polyethylene and copolymers thereof with fillers, lubricants and antitoxidants in a plasticating means until said fillers, lubricants and antioxidants are evenly dispersed throughout the polymers;
   b. processing the final polymer, filler, lubricant, antioxidant mixture into pellets;
   c. drying said pellets;
   d. contacting and mixing said pellets with a stochiometric amount of a curing agent in an air fluid bed at a temperature below the softening point of said pellets and below the decomposition temperature of said curing agent with a continuous flow of turbulent air whereby said curing agent is coated upon and absorbed into said pellets.

2. The method of claim 1 further including the step of cooling the dried pellets of step (c) to a temperature of about 50° C prior to contacting said dried pellets with said curing agent.

3. The method of claim 1 wherein step (d) comprises blowing turbulent air through said pellets for from about 4 to about 9 hours.

4. The method of claim 1 further including the step of cooling said pellets coated with curing agent to a temperature of no more than 25° C before storing said pellets.

5. The method of claim 1 further including heating the dried pellets to a temperature of from about 45° C to about 75° C, spraying said pellets with from about 0.01 to about 10.0 percent by weight of an organic peroxide curing agent selected from a group consisting of dicumylperoxide and α,α-bis(t-butylperoxy)-diiopropyl benzene and simultaneously subjecting the mixture of pellets and organic peroxide to violent agitation with turbulent air.

6. The method of claim 1 wherein said pellets consist essentially of about 69.82 percent polyethylene, about 1.52 percent α,α-bis(t-butylperoxy)-diisopropyl benzene, about 0.345 percent polymerized-1,2,-dihydro-2,2,4-trimethylquinoline, about 27,970 percent carbon black and about 0.345 percent zinc stearate.

7. The method of claim 1 wherein said pellets consist essentially of about 83.264 percent polyethylene, about 1.748 percent α,α-bis(t-butylperoxy)-diisopropyl benzene, about 0.416 percent 1,2-dihydro-2,2,4-trimethylquinoline, about 14.156 percent carbon black and about 0.416 percent zinc stearate.

8. The method of claim 1 wherein said pellets consist essentially of about 65.42 percent polyethylene, about 8.51 percent chlorinated polyethylene, about 5.23 percent antimony trioxide, about 18.45 percent clay, about 0.16 percent polymerized-1,2,-dihydro-2,2,4-trimethyl quinoline, about 0.26 lead oxide, about 0.33 percent zinc stearate and about 1.64 percent α,α-bis(t-butylperoxy)-diisopropyl benzene.

* * * * *